United States Patent [19]

Nomura

[11] Patent Number: 5,267,088
[45] Date of Patent: Nov. 30, 1993

[54] CODE PLATE MOUNTING DEVICE

[75] Inventor: Hiroshi Nomura, Tokyo, Japan

[73] Assignee: Asahi Kogaku Kogyo Kabushiki Kaisha, Tokyo, Japan

[21] Appl. No.: 609,700

[22] Filed: Nov. 6, 1990

[30] Foreign Application Priority Data

Nov. 10, 1989 [JP] Japan .............................. 1-131318[U]
Nov. 20, 1989 [JP] Japan .............................. 1-134765[U]

[51] Int. Cl.⁵ .................... G02B 7/02; G03B 1/18
[52] U.S. Cl. ........................... 359/811; 359/815; 359/819; 354/195.1
[58] Field of Search ............. 354/485, 195.1-195.12, 354/289.1-295, 400, 402, 408; 359/811-830, 896, 694-706

[56] References Cited

U.S. PATENT DOCUMENTS

| | | | |
|---|---|---|---|
| 4,101,223 | 7/1978 | Mutsushita | 354/286 |
| 4,585,308 | 4/1986 | Negoro | 359/830 |
| 4,639,108 | 1/1987 | Sakai et al. | 354/289.1 |
| 4,750,821 | 6/1988 | Yamamoto et al. | 359/694 |
| 4,785,320 | 11/1988 | Liberty, II et al. | 354/295 |
| 5,012,273 | 4/1991 | Nakamura et al. | 354/233 |
| 5,051,764 | 9/1991 | Nomura | 354/195.12 |

FOREIGN PATENT DOCUMENTS

| | | |
|---|---|---|
| 1845686 | 1/1962 | Fed. Rep. of Germany . |
| 59311 | 4/1985 | Japan .............................. 359/823 |
| 113042 | 5/1986 | Japan .............................. 354/289.12 |
| 144005 | 6/1989 | Japan .............................. 359/704 |
| 1-150109 | 6/1989 | Japan . |
| 2090906 | 7/1982 | United Kingdom . |

*Primary Examiner*—Bruce Y. Arnold
*Assistant Examiner*—Thong Nguyen
*Attorney, Agent, or Firm*—Sandler, Greenblum & Bernstein

[57] ABSTRACT

A code plate mounting device for mounting a code plate on an outer peripheral surface of an annular member in a lens barrel. A pair of engaging portions are provided on the outer peripheral surface of the annular member, and are spaced from one another in a circumferential or axial direction of the annular member. A tension member is connected at one end to one end of the code plate. An engaging portion is provided on the other end of the code plate to engage with one of the engaging portions of the annular member. An engaging portion is provided on the other end of the tension member to engage with the other engaging portion of the annular member.

44 Claims, 5 Drawing Sheets

CODE PLATE MOUNTING DEVICE

BACKGROUND OF THE INVENTION

1. Field of the Invention

The present invention relates to a mounting device of a code plate which is used to detect focal length data or the like, for example in a zoom lens camera 2. Description of the Related Art In a conventional photographing lens, such as a zoom lens, a two-focus lens, or a macro lens, etc., a cam ring is either manually or automatically rotated by a motor to move a group of variable power lenses provided in the cam ring in the optical axis direction, so that the variable power lenses move away from and towards each other to change the focal length thereof or the like. In a camera having such a photographing lens, lens information (data), such as the varied focal length or the open F-number, which varies in accordance with the focal length, are automatically detected to effect the operation of the camera.

A code plate which is provided on the outer periphery of the cam ring and which is selectively brought into contact with brushes has been used as an automatic detecting means for detecting the lens data which has been used. This has been done so that the position of the contact of the brushes with the code plate is read as position data. The position data thus read is converted to focal length data, etc. The code plate is usually attached to the cam ring with an adhesive tape or by set screws. In this attaching mechanism, the precision of the detection of the position data largely depends on the precision of the attachment of the code plate.

However, it is very difficult to precisely attach the code plate to the outer cylindrical periphery of the cam ring with adhesive tape. Furthermore, an undesirable displacement of the code plate on the cam ring tends to occur during the attachment, which is in any case a troublesome operation. If the code plate is reattached to the cam ring, for example, after a failure to attachment, the code plate tends to detach from the cam ring because of a decrease in the adhesive force, due to aging.

On the other hand, in the case of the attachment of the code plate using set screws, there is no (or a lesser) possibility of detachment due to aging. However, the engagement of the set screws in corresponding small threaded holes is a troublesome and time-consuming operation, thus resulting in decreased efficiency of assembly.

SUMMARY OF THE INVENTION

The primary object of the present invention is to provide a simple mounting device which can easily position and mount a code plate to an annular member (e.g. a cam ring) and which can prevent the attached code plate from becoming detached from the annular member due to aging, or other factors.

To achieve the object mentioned above according to the present invention, there is provided a code plate mounting device for mounting a code plate on an outer peripheral surface of an annular member in a lens barrel. The code plate mounting device comprise a pair of engaging portions which are provided on the outer peripheral surface of the annular member and which are spaced from one another in a circumferential or axial direction of the annular member, a tensile member which is connected at one end to one end of the code plate, an engaging portion which is provided on the other end of the code plate to engage with one of the engaging portions of the annular member, and an engaging portion which is provided on the other end of the tensile member to engage with the other engaging portion of the annular member.

With this arrangement, the code plate is engaged at one end thereof by the engaging portion of the annular member and at the other end by the other engaging portion of the annular member while tensioning the other end of the code plate against the spring force of the elastic member. Thus, the positioning of the code plate can be automatically and precisely effected.

According to another aspect of the present invention, the annular member is provided with a recess corresponding to the code plate, so that the code plate is received in the recess. The engaging portion of the annular member is provided in the recess. The code plate is made of a generally C-shaped elastic, or flexible plate having a length that is longer than half the whole circumferential length of the annular member and a curvature substantially corresponding to the curvature of the bottom of the recess. The code plate has an engaging and positioning hole in which the engaging portion in the recess is engaged.

With this construction, the code plate can be firmly fitted in the recess of the cam ring (annular member) due to the flexibility or elasticity of the code plate. Furthermore, the positioning of the code plate is effected by the engaging portions and the recess.

The invention can be also applied to the attachment of the code plate to an inner peripheral surface of the cam ring (annular member). To this end, according to an aspect of the present invention, there is provided a code plate mounting device for mounting a code plate on an inner peripheral surface of an annular member in a lens barrel, comprising at least one engaging portion which is provided on the inner peripheral surface of the annular member, a code plate which is made of an elastic or flexible plate and which is curved at a curvature that is smaller than that of the inner peripheral surface of the annular member, and an engaging portion which is provided on the code plate to engage with at least one engaging portion of the annular member.

The annular member preferably has, on the one hand, a pair of engaging portions which are spaced from one another in the circumferential direction thereof, and, on the other hand, a code plate which is generally made of a G-shaped elastic plate having a curvature corresponding to the curvature of the annular member and has at its opposite ends engaging portions which are engaged by the engaging portions of the annular member.

BRIEF DESCRIPTION OF THE DRAWINGS

The invention will be described below in detail with reference to the accompanying drawings, in which.

DESCRIPTION OF THE PREFERRED EMBODIMENTS

Figure 1:
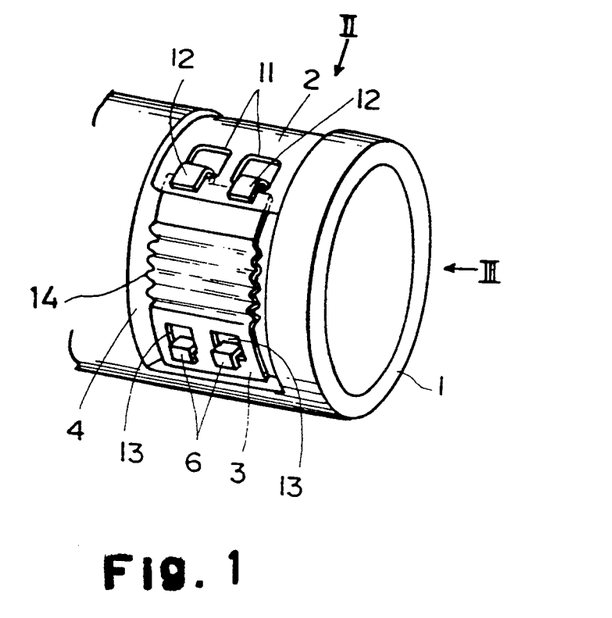
FIG. 1 is a perspective view of a mounting device according to a first embodiment of the present invention.
Figure 2:
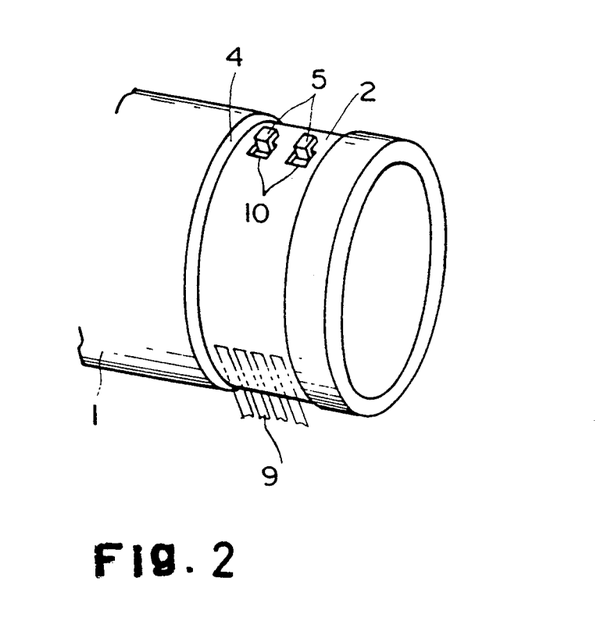
FIG. 2 is a perspective view of a mounting device, as viewed from a direction of an arrow II in FIG. 1.
Figure 3:
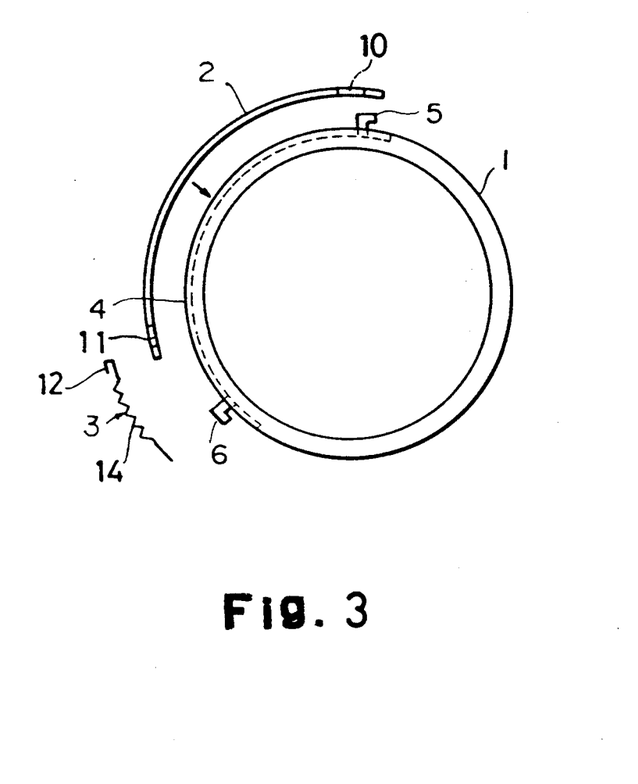
FIG. 3 is a front elevational view of a mounting device, as viewed from a direction of an arrow III in FIG. 1.

In FIGS. 1, 2 and 3, which show a main part of a zoom lens to which a first embodiment of the present invention is applied, an annular member, such as a cam ring 2, is rotatably supported in a stationary lens barrel (not shown). The lens barrel is secured to a camera body (not shown). A group of variable power lenses is supported in the cam ring 1 through a cam mechanism, which is known per se. The cam ring 1 is rotated in association with the rotation of a zoom motor (not shown) to move the variable power lens group in the optical axis direction through the cam mechanism, so that the variable power lenses move away from and towards each other to effect a zooming and macrophotographing operation.

The cam ring 1 is provided on its outer cylindrical periphery, with a peripheral recess 4 corresponding to a code plate 2. The recess 4 which extends in the circumferential direction, has a pair of projecting hooks (engaging members) 5 and 6 at opposite ends thereof. Each of the hooks 5 and 6 has two hook elements which are spaced from one another in the optical axis direction. The hooks 5 and 6 are bent at their front ends (free ends) in opposite directions, as shown in FIG. 3. The code plate 2 which codes the angular displacement of the cam ring 1, is received in the recess 4 through an elastic member 3.

Figure 4:
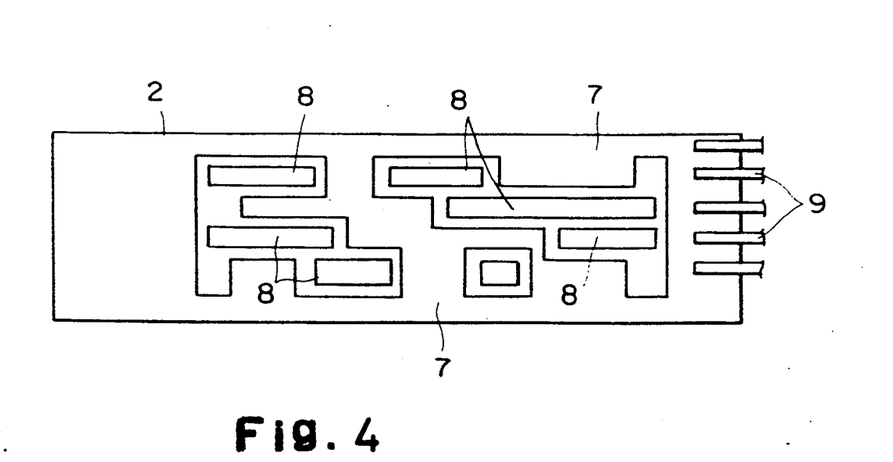
FIG. 4 is a schematic view of a developed code plate, shown in FIG. 1.

The code plate 2 has a thin sheet of flexible insulation which is provided on its surface with a plurality of rows having a predetermined pattern of electrically conductive area 7 and dummy terminals 8, as shown in FIG. 4, to form a plurality of codes that are used to determine the angular displacement of the cam ring 1. The conductive areas 7 and the dummy terminals 8 in each row are selectively brought into contact with associated brushes 9 which are secured to an immovable part of the lens barrel. The brushes 9 are electrically connected to a microcomputer (not shown), so that an electrical level "HIGH" or "LOW") of the brushes 9 which are connected to the conductive areas 7 or the dummy terminals 8 is inputted to the microcomputer which converts the electrical signals to a predetermined data, such as focal length data. Although the data is inputted from the brushes 9 into the microcomputer in the illustrated embodiment, it is possible to provide lines which are connected to the microcomputer on the code plate 2 in order to input the necessary data from the code plate 2 into the microcomputer. Furthermore, if the cam ring 1 is located outside the lens barrel, the code plate 2 can be attached to the outer periphery of the lens barrel. In this alternative, the brushes 9 can be mounted to the cam ring 1.

The code plate 2 has at one end two engaging holes 10 in which the two associated hooks 5 of the recess 4 are engaged and at its opposite end a pair of engaging holes 11 to which the elastic member 3 is connected.

The elastic member 3, which is made of a flexible or elastic material, has an intermediate corrugated portion 14 which serves as a tension spring. The elastic member 3 has at its one end two hooks 12 which are engaged in the engaging holes 11 of the code plate 2 and at the opposite end two engaging holes 13, in which the corresponding hooks 6 of the recess 4 are engaged.

The circumferential distance between the engaging holes 10 of the code plate 2 and the outer edge of the engaging holes 13 of the elastic member 3 is smaller than the circumferential distance between the hooks 5 and 6 when the elastic member 3, which is connected to the code plate 2, is not tensioned.

The code plate 2 is mounted to the cam ring 1 as follows:

The two engaging holes 10 of the code plate 2 are first engaged by the hooks 5 of the recess 4. Thereafter, the engaging holes 11 of the code plate 2 which extends in and along the recess 4 are engaged by the hooks 12 of the elastic member 3. After that, the elastic member 3 is tensioned, so that the hooks 6 of the recess 4 are engaged in the corresponding engaging holes 13 of the elastic member 3. Consequently, the code plate 2 is positioned in the recess 4 along the peripheral surface of the cam ring 1 (i.e. the bottom surface of the recess 4) by the tension force of the elastic member 3.

If the code plate 2 is made of a non-flexible material, the code plate 2 is curved into an arched shape corresponding to the shape of the recess 4. In this case, for example, the elastic member 3 is first connected to the code plate 2, and then, the engaging holes 10 of the code plate 2 are engaged by the associated hooks 5 of the recess 4. Thereafter, the engaging holes 13 of the elastic member 3 are engaged by the hooks 6 of the cam ring 1. The order of the operation per se is not significant in the present invention.

As can be seen from the foregoing, according to the present invention, the circumferential position and the axial position of the code plate 2 are restricted by the engagement of the hooks 5 and the associated engaging holes 10 and by the recess 4, respectively. Thus the positioning of the code plate 2 can be easily and precisely effected. Furthermore, since the code plate 2 is retained by the engagement of the hooks and the elastic force of the elastic member 3, the code plate 2 can be easily and simply mounted to the cam ring 1 and no detachment of the code plate 2 from the cam ring 1, due to aging occurs.

Although the recess 4 extends on the outer periphery of the cam ring 1 by approximately half the circumference of the cam ring 1 in the illustrated embodiment, the circumferential length of the recess 4 is not limited thereto and depends on the circumferential length of the code plate 2, and more precisely, the circumferential length of an assembly of the code plate 2 and the elastic member 3. It is also possible to provide a recess 4 which extends along the whole circumference of the cam ring 1. Furthermore, the recess 4 can be replaced with guide rails (continuous or discontinuous projections) which guide the side edges of the code plate 2.

Furthermore, the recess 4 can be dispensed with, since a possible influence of the precision of the attachment of the code plate 2 in the axial direction on the precision of the detection of the angular displacement of the cam ring is negligible.

The elastic member 3, which is made of an elastic sheet with a corrugated portion in the illustrated embodiment, can be made of rubber with no corrugated portion.

Although the hooks 5, 6 and 12 are provided on the cam ring 1 and the associated engaging holes 10 and 13 are provided on the code plate 2 and the elastic member 3, respectively, it is possible to provide the hooks on the code plate 2 and the elastic member 3 and the engaging holes on the cam ring 1. The number of hook elements of the hooks 5, 6 and 12, is not limited to two and can be one, or more than two.

Figure 5:
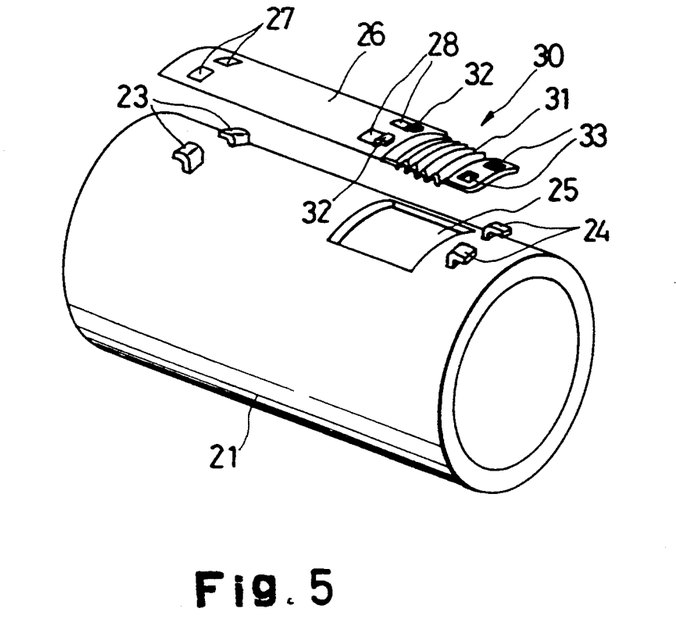
FIGS. 5 and 6 are perspective views of a mounting device according to the second and third embodiments of the present invention, respectively.

FIG. 5 shows a second embodiment of the present invention, in which the cam ring moves linearly in the optical axis direction.

A cam ring 21 is attached to, and in, the stationary lens barrel so as to linearly move in the optical axis direction by a guide mechanism (not shown), which is per se known. The cam ring 21 is provided on its outer periphery with a pair of projecting hooks 23 and 24 which are spaced from one another at a predetermined distance in the optical axis direction. Each of the hooks 23 and 24 have two hook elements which are circumferentially spaced from one another.

The cam ring 21 is provided on its outer periphery with an escape groove 25 located adjacent to the hook 24.

The code plate 26 extends along the optical axis direction and is closely attached to the outer peripheral surface of the cam ring 21. The code plate 26 is bent so as to extend along the cylindrical surface of the cam ring 21. The code plate 26 is provided on its outer surface with a plurality of rows of a predetermined pattern of electrically conductive lands and dummy terminals, similar to the code plate 2 shown in FIG. 4.

The code plate 26 has a pair of engaging holes 27 in which the hooks 23 are engaged and a pair of engaging holes 28 to which an elastic member 30 is connected, at one end and the other end of the code plate 26, respectively.

The elastic member 30, which is made of a flexible material has an intermediate corrugated portion 31 which serves as a tension spring. In the vicinity of the opposite ends of the corrugated portion 31 of the elastic member 30 are provided two hooks 32 which are engaged in the engaging holes 28 of the code plate 26 and two engaging holes 33 in which the hook elements 24 of the cam ring 21 are engaged, respectively. The elastic member 30 is curved to correspond to the curvature of the bottom of the escape groove 25 of the cam ring 21.

In the illustrated embodiment, the hooks 32 of the elastic member 30 are engaged in the engaging holes 28 of the code plate 26 so as to connect the elastic member 30 to the code plate 26. After that, the hook elements 23 of the cam ring 21 are engaged in the engaging holes 27 of the code plate 26 and the elastic member 30 is tensioned to engage the hook elements 24 in the associated engaging holes 33 of the elastic member 30. This completes the attachment of the code plate 26 to the cam ring 21. In this state, the corrugated portion 31 is received in the escape groove 25 of the cam ring 21. Accordingly, the code plate 26 comes into close surface contact with the outer surface of the cam ring 21 without a gap.

Figure 6:
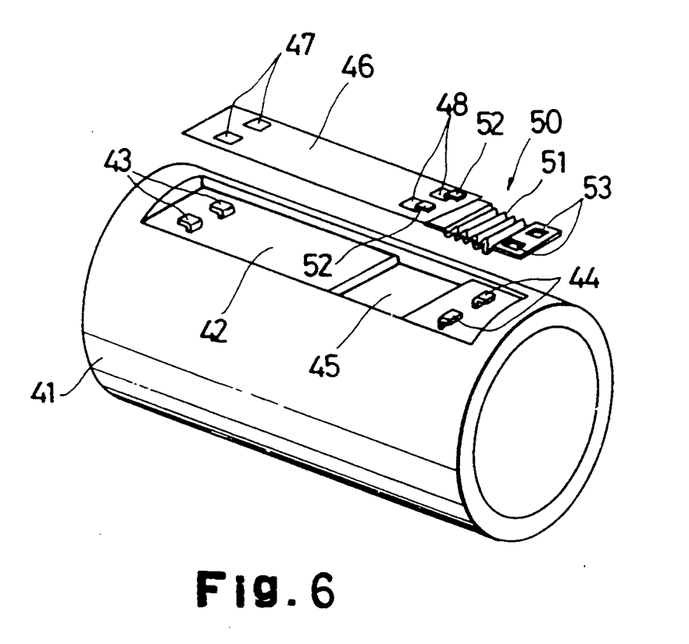

FIG. 6 shows another (third) embodiment of the present invention in which a code plate 46 is in the form of a flat plate. Cam ring 41 is provided on its outer surface with an elongated recess 42 with a flat bottom surface, corresponding to the code plate 46.

Hooks 43 and 44 are provided on the bottom of the recess 42 at opposite ends of the length of the recess 42. Each of the hooks 43 and 44 has two hook elements which are circumferentially spaced from one another.

The recess 42 is provided on its bottom with an escape groove 45 having the same function as the escape groove 25 shown in FIG. 5.

The code plate 46 is provided on one end with two engaging holes 47 in which the hook elements 43 are engaged, and on its opposite end with two engaging holes 48 to which an elastic member 50 is connected, respectively.

The elastic member 50 which is made of a flexible material has an intermediate corrugated portion 51 which serves as a tension spring. The elastic member 50 has at one end two hooks 52 which are engaged in the associated engaging holes 48 and at the other end two engaging holes 53 in which the associated hook elements 44 of the cam ring 41 are engaged, respectively.

The code plate 46 can be attached to the cam ring 41 in the same manner as that of FIG. 5.

The code plate 46 mounted to the cam ring 41 is tensioned by the elastic member 50 and is kept in close surface contact with the bottom surface of the recess 42.

Although the above discussion has been directed to the embodiments in which the code plate is mounted to the outer periphery of the cam ring 21 or 41, which linearly moves in the optical axis direction, the present invention can be applied to a code plate which is mounted to an inner periphery of the cam ring.

Furthermore, in the arrangement shown in FIG. 6, the bottom surface of the recess 42 can be curved corresponding to the curvature of the cam ring 41.

The connecting mechanism of the first embodiment shown in FIGS. 1 through 3 can be used for connecting the code plate 26 or 46, the elastic member 30 or 50 and the cam ring 21 or 41.

As can be seen from the above discussion, according to the present invention, when the code plate is mounted to the annular member (cam ring), one end of the code plate engages with the engaging portion of the annular member and the other end of the code plate is tensioned against the biasing force of the elastic member to engage with the associated engaging portion of the annular member. Accordingly, the positioning of the code plate can be automatically and accurately effected, resulting in a simple and easy attachment of the code plate.

This simplifies the assembly, reduces the manufacturing cost of the product and increases the precision thereof.

Figure 7:
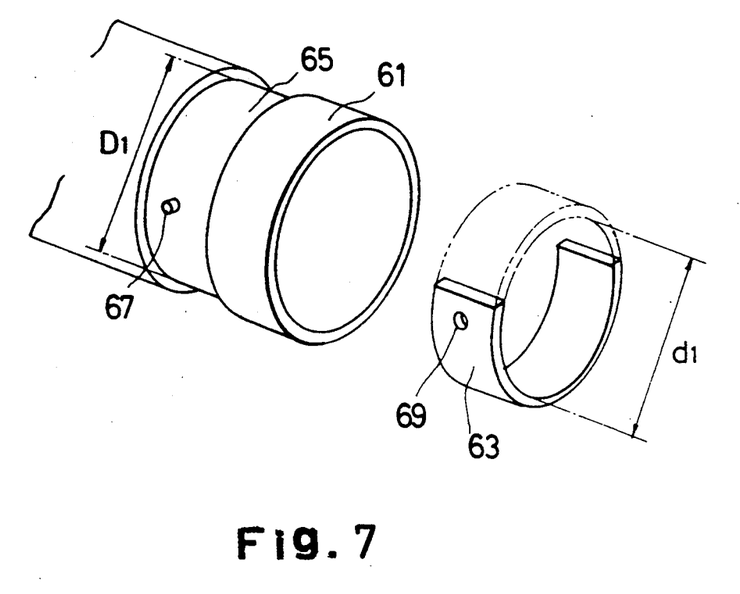
FIG. 7 is a perspective view of a main part of a mounting device according to a fourth embodiment of the present invention.
Figure 8:
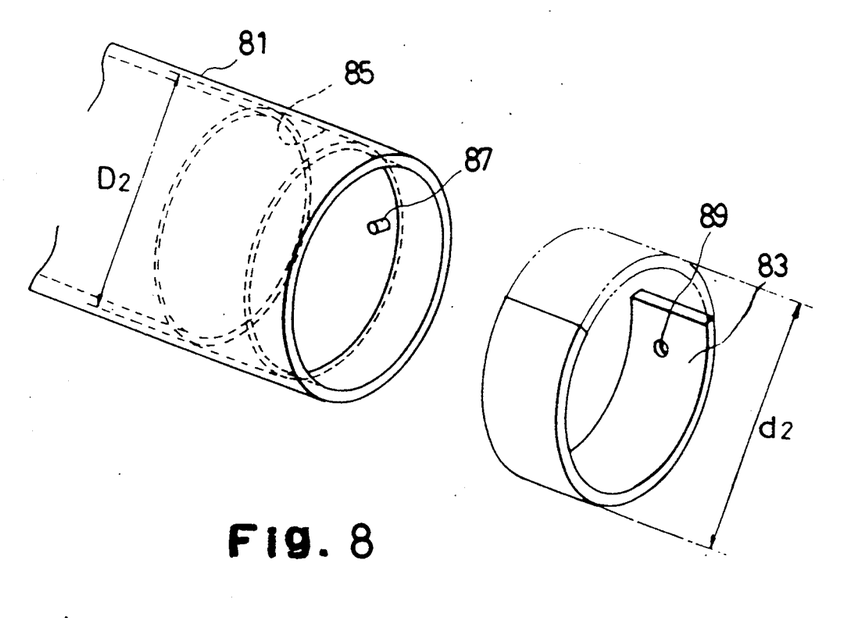
FIG. 8 is a perspective view of a main part of a mounting device according to a fifth embodiment of the present invention; and, FIG. 9 is a perspective view of a main part of a mounting device according to a sixth embodiment of the present invention.
Figure 9:
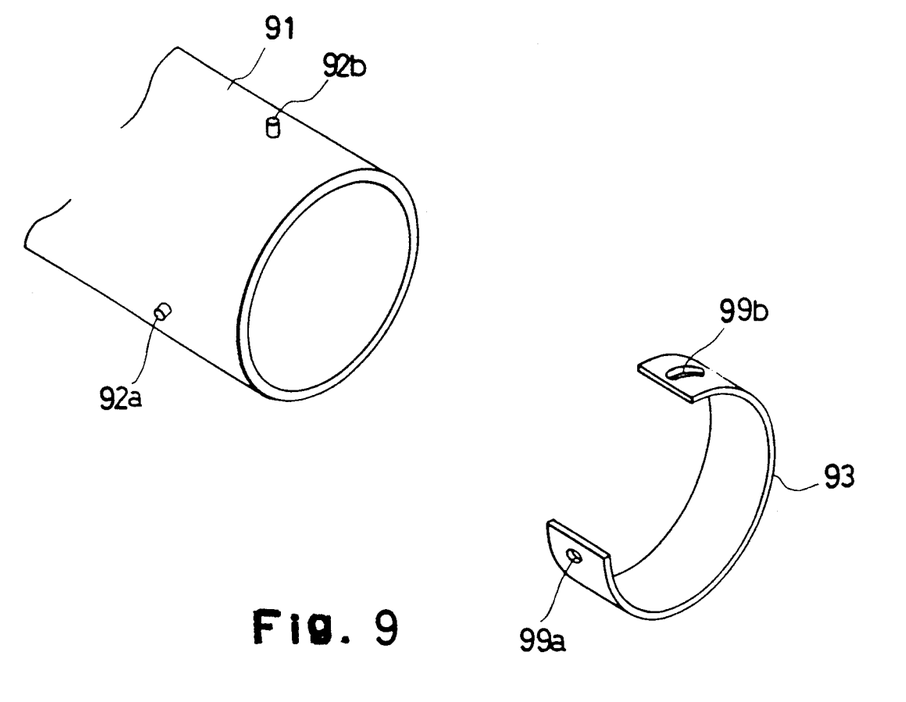

FIGS. 7 through 9 show different embodiments of the present invention in which the code plate is attached to the cam ring due to the flexibility (or elasticity) of the code plate.

In FIG. 7, which shows a main part of a zoom lens to which the present invention is applied, cam ring 61 (annular member) is rotatably supported in a stationary lens barrel secured to a camera body. Code plate 63 which codes the angular displacement of the cam ring 61, is mounted to the outer periphery of the cam ring 61.

A group of variable power lenses is supported in the cam ring 61 through a known cam mechanism, as mentioned above. The cam ring 61 rotates in association with the rotation of the zoom motor (not shown) to move the variable power lenses in the optical axis direction through the cam mechanism to perform the zooming.

The cam ring 61 is provided on its outer periphery with a circumferential recess 65 corresponding to the code plate 63. An engaging projection 67, which serves as a positioning and engaging element, is provided on the bottom of the recess 65. The cam ring 61 is formed, for example, by an injection molding of synthetic resin or the like. In addition, the engaging portion 67 may be integral with the cam ring 61.

The width of the recess 65 is such that when the code plate 63 is received therein, no undesirable displacement of the code plate in the recess occurs. The circumferential length of the recess 65 is longer than the whole length of the code plate 63, so as to completely accommodate the code plate 63 in the recess 65. The code plate 63 is made of a flexible or elastic thin plate or sheet and is generally C-shaped. The code plate 63 has at one end a positioning and engaging hole 69 in which the engaging projection 67 on the recess 65 of the cam ring 61 is fitted.

The curvature of the inner peripheral surface of the code plate 63 is larger than that of the bottom of the recess 65. Namely, diameter d1 of the inner peripheral surface of the code plate 63 is smaller than diameter D1 of the bottom of the recess 65 (d1<D1) (see FIG. 7).

The circumferential length of the code plate 63 is longer than half the whole circumferential length of the cam ring 61 (or half the whole circumferential length of the bottom of the recess 65).

Thus, the code plate 63, which is elastically expanded when received in the recess 65 presses against the bottom of the recess 65 by the contracting (restoring) force due to the flexibility or elasticity of the code plate, especially at the opposite ends of the code plate, so that the code plate can be firmly held on and closely brought into surface contact with the bottom of the recess 65.

Even if the circumferential length of the code plate 63 is shorter than half the whole circumferential length of the cam ring 61, the code plate 63 can be brought into close surface contact with the bottom of the recess and firmly held therein by the elastic restoring force of the code plate and the frictional force between the code plate and the recess.

The code plate 63 has thereon codes which code the angular displacement (angular position) of the cam ring 61 and which are read by the brushes secured to the lens barrel, similar to the code plate 2 shown in FIG. 4. Alternatively, it is possible to provide the code plate 63 the brushes on the stationary lens barrel and a rotary lens barrel (not shown), respectively.

The code plate 63 is mounted to the cam ring 61 as follows:

The generally C-shaped code plate 63 is elastically expand to slightly widen the opening defined between the opposite ends thereof, so that the code plate 63 can be fitted on the cam ring 61 in the axial direction to be brought into the recess 65. The engaging projection 67 of the cam ring 61 is fitted in the engaging hole 69 of the code plate 63. As soon as the external force is released, the code plate 63 is firmly fitted in the recess 65.

Namely, the position of the code plate 63 in the circumferential direction and in the axial direction is restricted by the engagement of the projection 67 and the engaging hole 69 at the end of the code plate 63 adjacent to the engaging hole 69. When the code plate 63 is completely received in the recess 65, the opposite side walls of the code plate 63 come into contact with the side walls of the recess 65, so that the axial position of the code plate 63 is fixed and no inclination of the code plate 63 in the recess 65 occurs.

As can be understood from the foregoing, according to the present invention, since the attachment of the code plate 63 to the cam ring 61 is completed merely by fitting the code plate 63 on the cam ring 61 against the elastic force of the code plate and by fitting the projection 67 of the cam ring 61 in the engaging hole 69 of the code plate, the assembly can be simplified and effected with a high precision.

Although the projection 67 and the engaging hole 69 are provided on the cam ring 61 and the code plate 63, respectively, in the illustrated embodiment, it is possible to provide the projection 67 and the engaging hole 69 on the code plate 63 and the cam ring 61, respectively.

FIG. 8 shows another embodiment of the present invention in which the code plate 83 is mounted to the inner peripheral surface of the cam ring 81.

In FIG. 8, the variable power lens group is supported in cam ring 81 through a known cam mechanism, as mentioned before. The cam ring 81 rotates in accordance with the rotation of the zoom motor to move the variable power lens group in the optical axis direction thereby, to effect the zooming operation.

The cam ring 81 is provided on its inner periphery with a circumferential recess 85 corresponding to code plate 83. Recess 85 has on its bottom an engaging and positioining projection 87.

The width of the recess 85 is such that when the code plate 83 is received therein, no undesirable displacement of the code plate in the recess occurs. The circumferential length of the recess 85 is longer than the whole length of the code plate 83 so as to completely accommodate the code plate 83 in the recess 85.

The code plate 83 is made of a flexible or elastic thin plate or sheet and is generally C-shaped. The code plate 83 has at one end a positioning and engaging hole 89 in which the engaging projection 87 on the recess 85 of the cam ring 81 is fitted.

The curvature of the outer peripheral surface of the code plate 83 is smaller than that of the bottom of the recess 85. Namely, diameter d2 of the outer peripheral surface of the code plate 83 is larger than diameter D2 of the bottom of the recess 85 (d2>D2).

The circumferential length of the code plate 83 is longer than half the whole circumferential length of the cam ring 81 (or half the whole circumferential length of the bottom of the recess 85).

Thus, the code plate 83, which is contracted when received in the recess 65, presses against the bottom of the recess 85 by the expanding (restoring) force due to the flexibility or elasticity of the code plate, particularly at the opposite ends of the code plate, so that the code plate can be firmly held on and closely brought into surface contact with the bottom of the recess 65.

The code plate 83 has, on its inner peripheral surface, codes which code the angular displacement (angular position) of the cam ring 81 and which are read by the brushes secured to the lens barrel, similar to the code plate 2 shown in FIG. 4.

The code plate 83 is mounted to the cam ring 81 as follows:

The generally C-shaped code plate 83 is elastically contracted to slightly reduce the distance between the opposite ends thereof, so that the code plate 83 can be inserted in the cam ring 81 in the axial direction to be brought into the recess 85. The engaging projection 87 of the cam ring 81 is fitted in the engaging hole 89 of the code plate 83. As soon as the external force is released, the code plate 83 is firmly fitted in the recess 85.

Namely, the position of the code plate 83 in the circumferential direction and in the axial direction is restricted by the engagement of the projection 87 and the engaging hole 89 at the end of the code plate 83 adjacent to the engaging hole 89. When the code plate 83 is completely received in the recess 85, the opposite side walls of the code plate 83 come into contact with the side walls of the recess 85, so that the axial position of the code plate 83 is fixed and no inclination of the code plate 83 in the recess 85 occurs.

As can be understood from the foregoing, according to the present invention, since the attachment of the code plate 83 to the cam ring 81 is completed merely by inserting the code plate 83 in the cam ring 81 while contracting the code plate 83 against the elastic force of the code plate 83 and by fitting the projection 87 of the cam ring 81 in the engaging hole 89 of the code plate 83, the assembly can be simplified and effected with a high precision.

Although the positioning of the code plate 63 or 83 in the optical axis direction is mainly effected by the recess 65 or 85 provided on the cam ring 61 or 81 in the above mentioned embodiments, it is possible to provide guide projections for positioning the code plate in place of the recess 65 or 85.

Although the projection 87 and the engaging hole 89 are provided on the cam ring 81 and the code plate 83, respectively, in the illustrated embodiments, it is possible to provide the projection 87 and the engaging hole 89 on the code plate 83 and the cam ring 81, respectively. There is no limitation to the number of the engaging projection(s) and the engaging hole(s).

The invention is not limited to the above mentioned embodiments in which the positioning of the code plate 63 or 83 is effected by one engaging projection 67 or 87 provided on recess 65 or 85 of the cam ring 61 or 81 and one engaging hole 69 or 89 formed on the code plate 63 or 83. For instance, it is possible to provide a pair of engaging projections and a pair of corresponding engaging holes on the code plate at the opposite ends thereof and on the cam ring, respectively, as shown in FIG. 9.

In FIG. 9, cam ring 91 is provided on its outer peripheral surface with a pair of engaging projections 92a and 92b which are circumferentially spaced from one another. Code plate 93 is provided on its opposite ends with a pair of engaging holes 99a and 99b corresponding to the engaging projections 92a and 92b of the cam ring 91. One of the engaging holes 99a and 99b, for example, the engaging hole 99b, is an elongated hole. The basic construction of the code plate 93 is substantially the same as that of the code plate 63 shown in FIG. 7. Therefore, the curvature of the code plate 93 is larger than that of the cam ring 91.

In the arrangement shown in FIG. 9, when the code plate 93 is attached to the cam ring 91, the generally C-shaped code plate 93 is widened at the opposite ends (free ends) thereof to fit it on the cam ring 91. After that, the projection 92b is first fitted in the corresponding engaging hole 99b. Thereafter, the engaging projection 92a of the cam ring 91 is fitted in the engaging hole 99a of the code plate 93. As soon as the external expanding force is released, the code plate 93 is elastically restored due to the elasticity or flexibility thereof so as to be fitted on the cam ring 91. The elongated hole 99b enables the code plate 93 to be elastically restored (contracted).

It should be appreciated that the concept shown in FIG. 9 can be applied to an alternative in which the code plate is mounted to the inner periphery of the cam ring.

As can be seen from the above discussion, according to the embodiment shown in FIG. 9, the code plate 93 can be easily mounted to the cam ring merely by engaging the engaging projections 92a and 92b in the corresponding engaging holes 99a and 99b due to the flexibility or elasticity of the code plate 93. Furthermore, since the circumferential position of the code plate 93 is determined by the engagement of the projection 92a in the engaging hole 99a and since the engagement of the other projection 92b in the corresponding engaging hole 99b prevents the code plate from being twisted or displaced relative to the cam ring, the code plate 93 can be precisely mounted to the cam ring 91.

The elongated hole 99b can be replaced with a large circular hole or a U-shaped groove having an open end. The shape of the engaging projections and the engaging holes is not limited to being circular and can be polygonal. The number of the engaging projections and the engaging holes is not limited to two. For example, it is possible to provide more than one pair of engaging projections and more than one pair of engaging holes which are aligned in the axial direction.

According to the embodiments shown in FIGS. 7 through 9, since the code plate is generally made of a C-shaped flexible or elastic plate substantially corresponding to the curvature of the annular member (cam ring), the code plate can be easily and firmly mounted to the annular member by the flexibility or elasticity of the code plate, resulting in no detachment of the code plate from the annular member due to aging.

I claim:

1. A photographic camera code plate mounting device for mounting a code plate on an outer peripheral surface of an annular member in a lens barrel, comprising:
    a pair of engaging portions which are provided on an outer peripheral surface of said annular member and which are spaced from one another in a predetermined direction of said annular member;
    a tension member which is connected at one end to one end of said code plate;
    an engaging portion which is provided on a second end of said code plate to engage with one of said engaging portions of said annular member; and,
    an engaging portion which is provided on a second end of said tension member to engage with a second engaging portion of said annular member.

2. A photographic camera code plate mounting device according to claim 1, wherein said annular member is attached to said lens barrel.

3. A photographic camera code plate mounting device according to claim 1, wherein said pair of engaging portions are spaced from one another at a predetermined distance in a circumferential direction on said annular member.

4. A photographic camera code plate mounting device according to claim 3, wherein said pair of engaging portions are in the form of hooks extending in opposite directions.

5. A photographic camera code plate mounting device according to claim 4, wherein at least one of said hooks comprises a plurality of hook elements.

6. A photographic camera code plate mounting device according to claim 1, wherein said annular member is provided with a circumferential recess in which said code plate and said tension member are received to restrict displacement of said code plate in an axial direction.

7. A photographic camera code plate mounting device according to claim 6, wherein hooks are provided in a circumferential recess.

8. A photographic camera code plate mounting device according to claim 7, wherein said engaging portions of said code plate and said tension member are in the form of engaging holes which engage said hooks provided in said recess.

9. A photographic camera code plate mounting device according to claim 8, wherein said code plate and said tension member are detachably attached to each other.

10. A photographic camera code plate mounting device according to claim 1, wherein one of said code plate and said tension member is provided with at least one engaging hook, the other of said code plate and said tension member is provided with at least one engaging hole in which said hook is engaged.

11. A photographic camera code plate mounting device according to claim 1, wherein said tension member is made of an elastic material.

12. A photographic camera code plate mounting device according to claim 1, wherein said tension member is made of a flexible material and has an intermediate retractable corrugated portion.

13. A photographic camera code plate mounting device according to claim 1, wherein said code plate is provided on its outer surface with a plurality of rows of a predetermined pattern of codes having electrically conductive portions and non-conductive portions which code an angular position of said annular member.

14. A photographic camera code plate mounting device according to claim 13, wherein said codes extend in an axial direction of said annular member, so that said angular position of said annular member is coded by a combination of said codes.

15. A photographic camera code plate mounting device according to claim 1, wherein said pair of engaging portions are in the form of hooks which are spaced from one another in an optical axis direction on said annular member.

16. A photographic camera code plate mounting device according to claim 15, wherein at least one of said hooks comprises a plurality of hook elements which are spaced from one another in a circumferential direction.

17. A photographic camera code plate mounting device according to claim 16, wherein said tension member is made of a resilient material and has an intermediate retractable corrugated portion.

18. A photographic camera code plate mounting device according to claim 17, wherein said annular member is provided on its outer peripheral surface with a recess in which said corrugated portion is retractably accommodated.

19. A photographic camera code plate mounting device according to claim 18, wherein one of said code plate and said tension member is provided with at least one engaging hook and the other of said code plate and said tension member is provided with at least one engaging hole in which said hook is engaged.

20. A photographic camera code plate mounting device according to claim 19, wherein said code plate and said tension member are curved to have a curvature that is substantially the same as that of said outer peripheral surface of said annular member.

21. A photographic camera code plate mounting device according to claim 17, wherein said annular member is provided with an axially extending recess in which said code plate and said resilient member are received to restrict the displacement of said code plate in said circumferential direction.

22. A photographic camera code plate mounting device according to claim 21, wherein said recess has a flat bottom.

23. A photographic camera code plate mounting device according to claim 22, wherein said tension member is made of a resilient material and has an intermediate retractable corrugated portion, and wherein said recess has a stepped recess in which said corrugated portion is retractably accommodated.

24. A photographic camera code plate mounting device according to claim 23, wherein said resilient material comprises an elastic material.

25. A photographic camera code plate mounting device according to claim 23, wherein said resilient material comprises a flexible material.

26. A photographic camera code plate mounting device according to claim 21, wherein said pair of engaging portions of said annular member are in the form of hooks provided on the bottom of said recess.

27. A photographic camera code plate mounting device according to claim 17, wherein said resilient material comprises an elastic material.

28. A photographic camera code plate mounting device according to claim 17, wherein said resilient material comprises a flexible material.

29. A photographic camera code plate mounting device according to claim 1, wherein said predetermined direction comprises a circumferential direction.

30. A photographic camera code plate mounting device according to claim 1, wherein said predetermined direction comprises an axial direction.

31. A photographic camera code plate mounting device for mounting a code plate on an outer peripheral surface of an annular member in a lens barrel, comprising:
an engaging portion which is provided on said outer peripheral surface of said annular member;
a code plate which is made of a resilient material and which has a curvature that is larger than that of said outer peripheral surface of said annular member, said annular member being provided with a recess in which said code plate is received, said engaging portion being provided on a bottom of said recess; and
an engaging portion which is provided on said code plate to engage with said engaging portion of said annular member, wherein said engaging provided on said bottom of said recess comprises a pin that is integral with said annular member.

32. A photographic camera code plate mounting device according to claim 31, wherein said engaging portion of the code plate comprises an engaging hole in which said pin is engaged.

33. A photographic camera code plate mounting device for mounting a code plate on an outer peripheral surface of an annular member in a lens barrel, comprising:

a pair of engaging portions which are provided on said outer peripheral surface of said annular member and which are spaced from one another by a predetermined distance in a circumferential direction;

a resilient code plate having a curvature that is larger than that of said outer peripheral surface of said annular member; and, engaging portions which are provided on said code plate to engage with said engaging portions of said annular member.

34. A photographic camera code plate mounting device according to claim 33, wherein said pair of engaging portions are in the form of pins that are integral with said annular member.

35. A photographic camera code plate mounting device according to claim 34, wherein said code plate is provided on its opposite ends with an engaging hole in which one of said pins of said annular member is engaged and an elongated hole which extends in said circumferential direction to engage therein the other pin of said annular member.

36. A photographic camera code plate mounting device according to claim 33, wherein said code plate is made from an elastic material.

37. A photographic camera code plate mounting device according to claim 33, wherein said code plate is made from a flexible material.

38. A photographic camera code plate mounting device for mounting a code plate on an inner peripheral surface of an annular member in a lens barrel, comprising:

an engaging portions which is provided on said inner peripheral surface of said annular member;

a resilient code plate having a curvature that is smaller than that of said inner peripheral surface of said annular member; and, an engaging portions which is provided on said code plate to engage with said engaging portion of said annular member.

39. A photographic camera code plate mounting device according to claim 38, wherein said annular member is provided with a recess in which said code plate is received.

40. A photographic camera code plate mounting device according to claim 37, wherein said engaging portion is provided on a bottom of said recess.

41. A photographic camera code plate mounting device according to claim 40, wherein said engaging portion provided on said bottom of said recess comprises a pin that is integral with said annular member.

42. A photographic camera code plate mounting device according to claim 41, wherein said engaging portion of said code plate comprises an engaging hole in which said pin is engaged.

43. A photographic camera code plate mounting device according to claim 38, wherein said code plate is made from an elastic material.

44. A photographic camera code plate mounting device according to claim 38, wherein said code plate is made from a flexible material.

* * * * *

UNITED STATES PATENT AND TRADEMARK OFFICE
CERTIFICATE OF CORRECTION

PATENT NO. : 5,267,088
DATED : November 30, 1993
INVENTOR(S) : Hiroshi NOMURA

It is certified that error appears in the above-indentified patent and that said Letters Patent is hereby corrected as shown below:

At column 12, line 58 (claim 31, line 16) insert ---portions--- after "engaging".
At column 14, line 3 (claim 38, line 5) change "portions" to ---portion---.

Signed and Sealed this

Thirty-first Day of October 1995

Attest:

BRUCE LEHMAN

Attesting Officer  Commissioner of Patents and Trademarks